US009563540B2

(12) United States Patent
Prasad et al.

(10) Patent No.: US 9,563,540 B2
(45) Date of Patent: Feb. 7, 2017

(54) AUTOMATED DEFECT POSITIONING BASED ON HISTORICAL DATA

(71) Applicants: Dhanyamraju S U M Prasad, Hyderabad (IN); Simy Chacko, Hyderabad (IN); Satya Sai Prakash K, Hyderabad (IN); Sekhar Ramaraju, Secunderabad (IN); Suresh Naidu P, Hyderabad (IN)

(72) Inventors: Dhanyamraju S U M Prasad, Hyderabad (IN); Simy Chacko, Hyderabad (IN); Satya Sai Prakash K, Hyderabad (IN); Sekhar Ramaraju, Secunderabad (IN); Suresh Naidu P, Hyderabad (IN)

(73) Assignee: HCL TECHNOLOGIES LTD, Chennai (IN)

( * ) Notice: Subject to any disclaimer, the term of this patent is extended or adjusted under 35 U.S.C. 154(b) by 0 days.

(21) Appl. No.: 14/507,855

(22) Filed: Oct. 7, 2014

(65) Prior Publication Data

US 2015/0370689 A1 Dec. 24, 2015

(51) Int. Cl.
*G06F 11/36* (2006.01)
(52) U.S. Cl.
CPC .................. *G06F 11/366* (2013.01)
(58) Field of Classification Search
CPC . G06F 11/366; G06F 11/3688; G06F 11/3664; G06F 11/3684
USPC .................................................. 717/124, 130
See application file for complete search history.

(56) References Cited

U.S. PATENT DOCUMENTS

| 7,159,021 | B2 * | 1/2007 | Boldman | H04L 12/2697 709/220 |
| 7,614,043 | B2 * | 11/2009 | Ognev | G06F 11/366 706/12 |
| 7,836,346 | B1 * | 11/2010 | Davidov | G06F 11/3692 714/38.1 |
| 8,510,602 | B2 * | 8/2013 | Chen | G06F 11/368 714/25 |
| 8,527,814 | B1 * | 9/2013 | Elwell | G06F 11/0793 714/2 |
| 2009/0265693 | A1 * | 10/2009 | Bakowski | G06F 11/3688 717/131 |
| 2011/0161938 | A1 * | 6/2011 | Marum | G06F 8/77 717/131 |
| 2013/0047141 | A1 * | 2/2013 | Shann | G06F 8/30 717/128 |

OTHER PUBLICATIONS

Nichols et al., Augmented Bug Localization Using Past Bug Information, ACMSE ' 10, Apr. 15-17, 2010.*
Hartman et al., What Would Other Programmers Do? Suggesting Solutions to Error Messages, CHI 2010, Apr. 10-15, 2010.*

* cited by examiner

*Primary Examiner* — Anna Deng
(74) *Attorney, Agent, or Firm* — VKM Law Group

(57) ABSTRACT

Disclosed herein are a method and a system for software defect positioning. The system collects at least one type of information with respect to the defect and analyzes the collected input to select a suitable mode of defect positioning procedure. The defect positioning procedures used by the system identify defect location/position based on history data. After identifying the location of the defect, the system communicates the identified defect location/position to a user using a suitable output interface.

3 Claims, 8 Drawing Sheets

AUTOMATED DEFECT POSITIONING BASED ON HISTORICAL DATA

The present application is based on, and claims priority from, Indian Complete Application number 2988/CHE/2014 filed on 19 Jun. 2014, the disclosure of which is hereby incorporated by reference herein

TECHNICAL FIELD

The embodiments herein relate to software development and testing and, more particularly, to automate defect positioning based on historical data, in software maintenance.

BACKGROUND

Software applicant is followed by a process called software application testing. In this process, the application developed is tested to ensure that the application is working properly. During the testing phase, test cases are written and executed corresponding to each section of the application such that number of test cases varies according to size and complexity of the application. Normally, any application is launched in its beta phase such that the developers' team accepts feedbacks from users over a period of time, identifies bugs, makes required changes to fix the bugs, and releases next version of the application. Each of such versions is called a 'build'.

When a bug is reported, the developer has to identify root cause of the bug to decide effective means to solve the problem. For large applications which involve lengthy and complex programming, it is difficult for the programmer to identify actual location of the defect. To solve this issue and help the developers identify location of the defect, a mechanism known as "defect positioning" is used.

Currently, multiple mechanisms are available to support defect positioning. However, these mechanisms require user assistance at various stages of processing such that accuracy of output depends on inputs provided by the user. Since quality of inputs vary based on expertise and skills of the user, accuracy of the outputs may also vary according to this; hence affecting quality of outputs sometimes.

SUMMARY

In view of the foregoing, an embodiment herein provides a method of historical data based defect positioning. In this method, a plurality of defect positioning procedures is used to identify position of defect, wherein each mode is selected based on type on inputs available. Using a defect positioning system, a first mode of defect positioning procedure is selected from the plurality of defect positioning procedures, if input is at least one of a defect title and defect description. Using the defect positioning system, a second mode of defect positioning procedure is selected from the plurality of defect positioning procedures, if the inputs are at least one of defect information, and information about at least one test case which caused the defect. Using the defect positioning system, a third mode of defect positioning procedure is selected from the plurality of defect positioning procedures, if the input is at least one defect information. Using the defect positioning system, a fourth mode of defect positioning procedure is selected from the plurality of defect positioning procedures if the input is a traceability matrix, wherein the traceability matrix is a mapping between at least one test case and corresponding source element changes. Further, location of the defect is identified using the at least one of selected mode of defect positioning procedure, based on the collected input and the history data, using the defect positioning system.

Embodiments further disclose a system for historical data based defect positioning. In this method, a plurality of defect positioning procedures is used to identify position of defect, wherein each mode is selected based on type on inputs available. Using a defect positioning system, a first mode of defect positioning procedure is selected from the plurality of defect positioning procedures, if input is at least one of a defect title and defect description. Using the defect positioning system, a second mode of defect positioning procedure is selected from the plurality of defect positioning procedures, if the inputs are at least one of defect information, and information about at least one test case which caused the defect. Using the defect positioning system, a third mode of defect positioning procedure is selected from the plurality of defect positioning procedures, if the input is at least one defect information. Using the defect positioning system, a fourth mode of defect positioning procedure is selected from the plurality of defect positioning procedures if the input is a traceability matrix, wherein the traceability matrix is a mapping between at least one test case and corresponding source element changes. Further, location of the defect is identified using the at least one of selected mode of defect positioning procedure, based on the collected input and the history data, using the defect positioning system.

Embodiments herein also disclose a computer program product for historical data based defect positioning. The product comprising of an integrated circuit comprising at least one processor; and at least one memory having a computer program code within the circuit. The memory and the computer program code with the at least one processor cause the product to select a first mode of defect positioning procedure from a plurality of defect positioning procedures if input is at least one of a defect title and defect description, a second mode of defect positioning procedure from the plurality of defect positioning procedures if the input is at least one of a defect information, and information about at least one test case which caused the defect; a third mode of defect positioning procedure from the plurality of defect positioning procedures if the input is at least one defect information, or a fourth mode of defect positioning procedure from the plurality of defect positioning procedures if the input is a traceability matrix, wherein the traceability matrix is a mapping between at least one test case and corresponding source element changes. Further, using the selected mode of defect positioning procedure and based on the collected input and the history data, location of the defect is identified.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
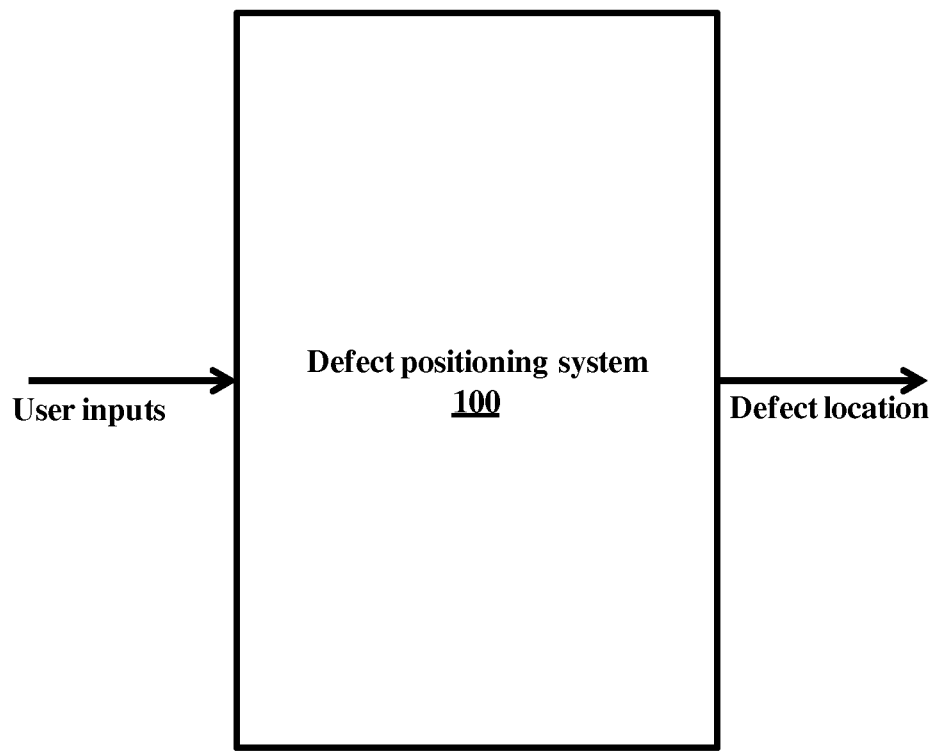
FIG. 1 illustrates a block diagram of defect positioning system, as disclosed in the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a mechanism for defect positioning in software by analyzing historical data. Referring now to the drawings, and more particularly to FIGS. 1 through 8, where similar reference characters denote corresponding features consistently throughout the figures, there are shown embodiments.

FIG. 1 illustrates a block diagram of defect positioning system, as disclosed in the embodiments herein. The defect positioning system 100 accepts from the user, at least one input related to the defect. For example, the input may be any of or a suitable combination of defect title, defect description, test case (s) which caused a particular defect in question, source code elements changed with respect to each test case being considered. In an embodiment, the defect positioning system 100 may choose a suitable mode of defect positioning procedure based on the type of inputs received. For example, when the inputs received are defect title and defect description, the defect positioning system 100 chooses a first mode of defect positioning procedure. When the inputs received are defect information and test case (s) which caused the defect, the defect positioning system 100 chooses a second mode of defect positioning procedure. When the input received is defect information only, the defect positioning system 100 chooses a third mode of defect positioning procedure. When the input is a traceability matrix which possesses mapping between source code elements and test cases, the defect positioning system 100 chooses a fourth mode of defect positioning procedure.

Using the suitable mode of defect positioning procedure, the defect positioning system 100 identifies location of the defect. Further, using a suitable output interface, the defect positioning system 100 communicates the identified defect position/location to a user.

Figure 2:
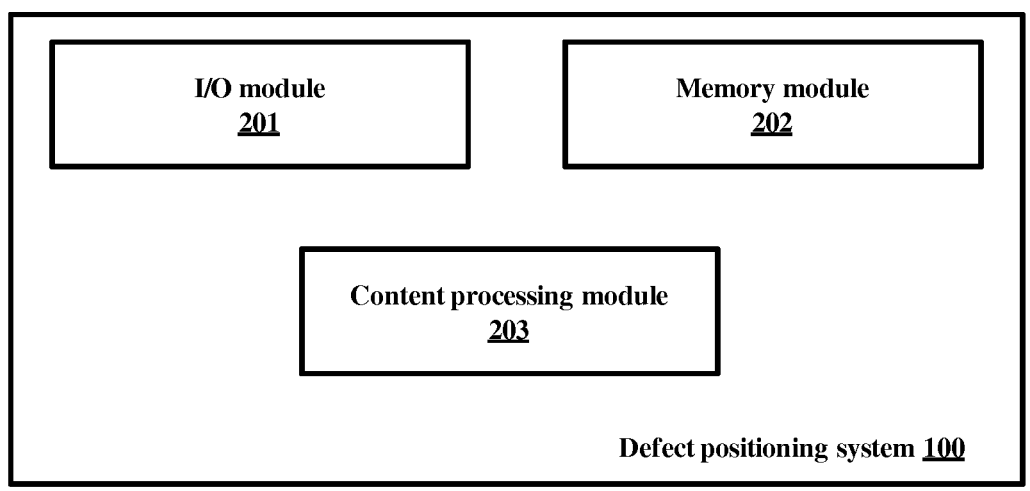
FIG. 2 illustrates a block diagram which shows components of the defect positioning system, as disclosed in the embodiments herein.

FIG. 2 illustrates a block diagram which shows components of the defect positioning system, as disclosed in the embodiments herein. The defect positioning system 100 comprises of an Input/Output (I/O) module 201, a memory module 202, and a content processing module 203. The I/O module 201 is used to collect inputs from user, as well as for communicating identified defect position as output to the user. The I/O module 201 may use any suitable hardware and/or software means, and communication technologies/interfaces to effectively receive inputs and provide outputs.

The memory module 202 is used to store various information required for content processing. The input (s) received from the user may be stored in the memory module 202 for further processing. The memory module 202 may possess information on the four modes of defect positioning procedure being used for defect positioning. The memory module 202 may further possess information on different technologies/procedures associated with different technologies being used for content processing and defect positioning. The memory module 202 may further possess information on user preference criteria pre-configured by the user, which may be applied during various stages of content processing. The memory module 202 may be further configured to store history data related to information such as but not limited to previously executed test cases, defects occurred, associated source code elements, and location of defects.

The content processing module 203 is used to process user inputs and identify location/position of defect. The content processing module 203 collects input (s) from the I/O module 201 and analyzes the input (s) based on criteria and rules specified by the user and which are stored in the memory module 202 to identify a suitable mode of defect positioning procedure. Further, the content processing module 203 processes the received inputs using the selected mode of defect positioning procedure and identifies location of the defect. The content processing module 203 may use any suitable content processing algorithm/application for the purpose of content processing and identification of defect position/location. Once the defect position/location is identified, the content processing module 203 communicates the identified defect location/position to the I/O module 201, which in turn communicates the data to the user.

Figure 3:
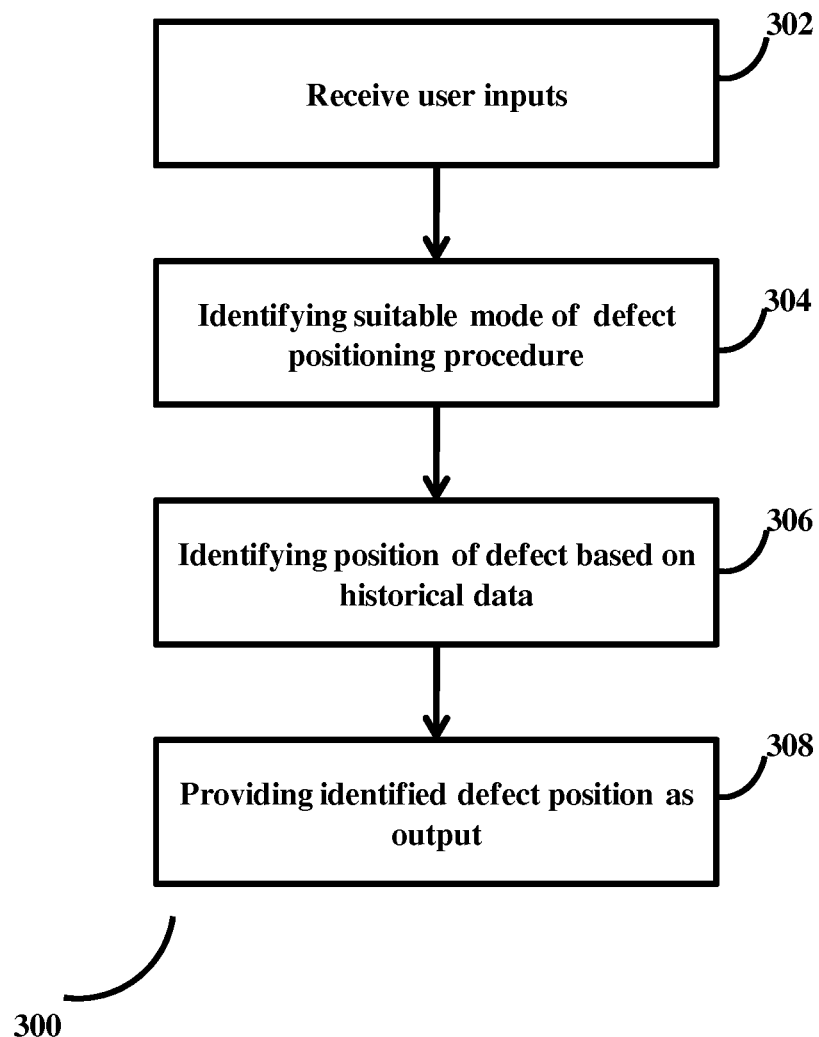
FIG. 3 is a flow diagram which depicts various steps involved in the process of historical data based defect positioning using the defect positioning system, as disclosed in the embodiments herein.

FIG. 3 is a flow diagram which depicts various steps involved in the process of historical data based defect positioning using the defect positioning system, as disclosed in the embodiments herein. The defect positioning system 100 receives (302) user input (s) related to a defect being identified, for which defect positioning procedure is to be executed. By analyzing the received input (s), and based on pre-configured rules/criteria specified and stored in the memory module 202, the content processing module 203 associated with the defect positioning system 100 identifies (304) and selects a suitable mode of defect positioning procedure which best suits processing of received input (s). For example, when the inputs received are defect title and defect description, the defect positioning system 100 chooses a first mode of defect positioning procedure. When the inputs received are defect information and test case (s) which caused the defect, the defect positioning system 100 chooses a second mode of defect positioning procedure. When the input received is defect information only, the defect positioning system 100 chooses a third mode of defect positioning procedure. When the input is a traceability matrix which possesses mapping between source code elements and test cases, the defect positioning system 100 chooses a fourth mode of defect positioning procedure.

Further, using the selected mode of defect positioning procedure, the content processing module 203 processes the received inputs and identifies (306) position of the defect. In a preferred embodiment, the content processing module 203 processes the received inputs based on at least one rule/ criteria specified by the user, which is stored in the memory module 202. Further, the defect positioning system 100 provides (308) the identified position as output to the user, using a suitable output interface associated with the I/O module 201.

The various actions in method 300 may be performed in the order presented, in a different order or simultaneously. Further, in some embodiments, some actions listed in FIG. 3 may be omitted.

Figure 4:
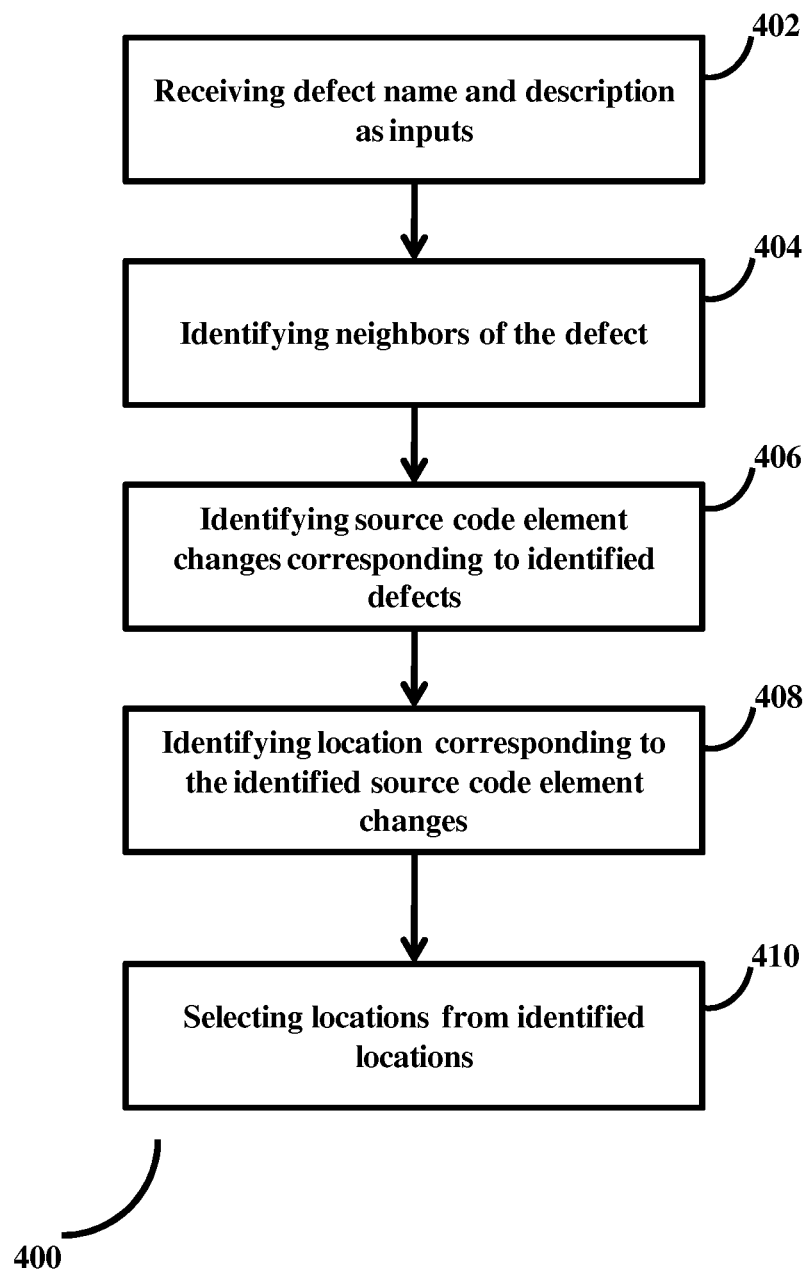
FIG. 4 is a flow diagram which depicts various steps involved in the process of historical data based defect positioning using a first mode of defect positioning procedure, as disclosed in the embodiments herein.

FIG. 4 is a flow diagram which depicts various steps involved in the process of historical data based defect positioning using a first mode of defect positioning procedure, as disclosed in the embodiments herein. Input required to execute the first mode of defect positioning procedure are defect title, and defect description. In an embodiment, the user may provide the defect title and description in own words. In another embodiment, the user may browse through, identify, and choose/select the defect title and description from a list of defect titles and description provided in the memory module 202. In either case, the content processing module 203 in the defect positioning system 100 chooses suitable content processing schema to process the user inputs. For example, when the user randomly provides inputs, the content processing module 203 may use natural language processing algorithms to process the user inputs.

Further the content processing module 203 identifies 'n' neighbors of the defect, wherein value of 'n' is pre-configured by the user. The neighbors of the defect may be identified by comparing the title and description provided by the user as inputs against title and description of each defect; information of which is stored in the memory module 202, using any suitable data comparison algorithm. In an embodiment, after identifying a number (n) of neighbors of the defect, the content processing module 203 may choose a pre-defined number of neighbors for further processing. Choosing 'n' number of neighbors involves sorting the neighbors based on a similarity index, wherein similarity index indicates degree of similarity of a particular defect with the input defect. For example, similarity index may be defined on a scale of 1-10 wherein 10 indicates maximum similarity, and 1 indicates minimum similarity. Now, if similarity index of a defect is 9, that means that particular defect is very similar to the input defect. If similarity index of a defect is 3, that means similarity of the defect with the input defect is less. After identifying similarity index of all defects, they may be sorted in the ascending or descending order of similarity index value as specified in user criteria. Further, 'n' number of defects can be selected which has higher similarity index value (which indicates higher degree of closeness to the input defect).

Further, the content processing module 203 identifies (406) source code element changes corresponding to the selected defects, by performing database mining of history database. For example a defect database, source code repository, or source code comments may be analyzed to identify source code changes corresponding to the selected defects. The content processing module 203 also identifies (408) location of all source codes elements which are found to have changed corresponding to each neighbor defect selected.

Once the source code element locations are identified, then the content processing module 203 selects (410) a specified number ('m') of locations from the identified locations for further processing. In a preferred embodiment, the selection of 'm' locations is based on at least one criteria defined and pre-configured by the user. For example, the criteria set by the user may be more frequently occurred code elements, or similar criteria, or a suitable combination of two or more selected criteria. The locations thus shortlisted are then suggested to the user. System allows user to do further filtering by displaying all change history, information related to lines that are fixed each time, and other bugs fixed in the source file.

The various actions in method 400 may be performed in the order presented, in a different order or simultaneously. Further, in some embodiments, some actions listed in FIG. 4 may be omitted.

Figure 5:
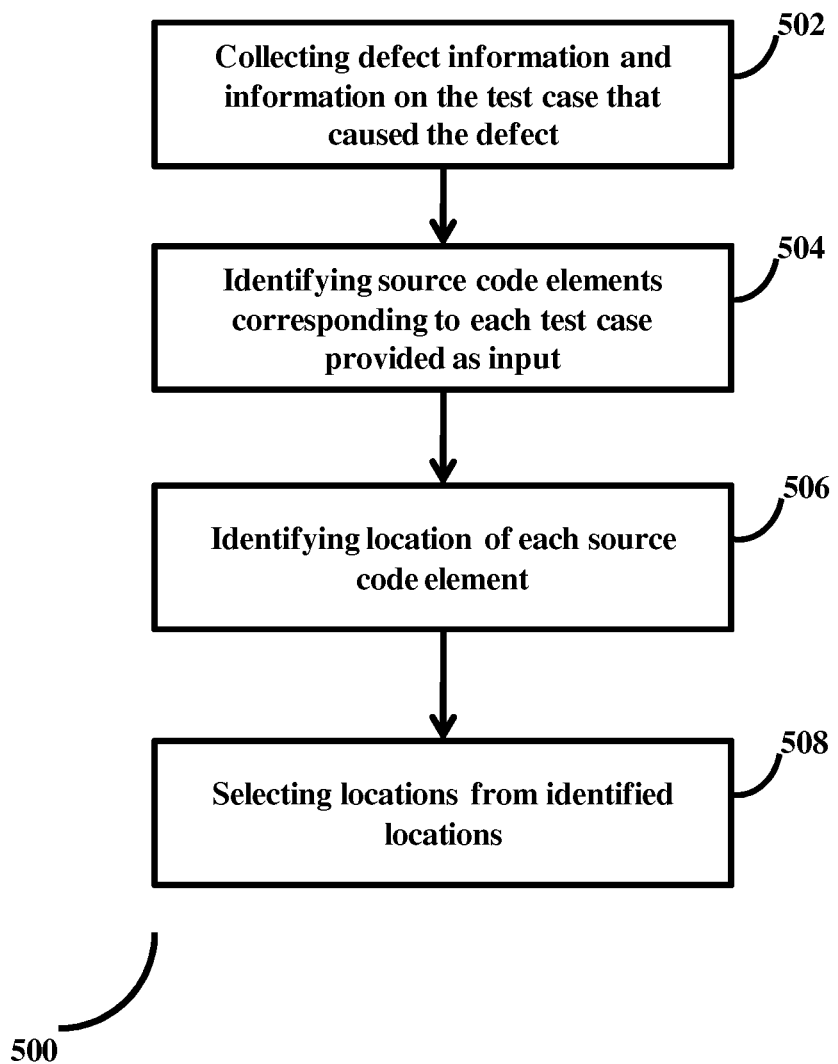
FIG. 5 is a flow diagram which depicts various steps involved in the process of historical data based defect positioning using a second mode of defect positioning procedure, as disclosed in the embodiments herein.

FIG. 5 is a flow diagram which depicts various steps involved in the process of historical data based defect positioning using a second mode of defect positioning procedure, as disclosed in the embodiments herein. To execute second method, the content processing module 203 collects (502) defect information, and information regarding test case (s), execution of which caused the defect; as inputs. In an embodiment, the information pertaining to defects and test case (s) responsible for the defect is available from a bug database.

Further, the content processing module 203 identifies (504) source code elements corresponding to test case received as input. In an embodiment, the source code elements corresponding to test cases are identified by performing database mining of history data. For example, test execution history, and source code changes database may be used to obtain information about source code elements. Further, the content processing module 203 identifies (506) location of each of the source code elements using the data mining process.

After identifying locations of the source code elements, the content processing module 203 sorts a list (LS) of the identified source code elements based on pre-defined criteria. For example, the criteria may be defined based on at least one of a last change time, software metrics such as Cyclomatic complexity, or number of defects mapped to given code element.

After sorting the list, the content processing module 203 selects (508) a specific number (m) of items from the sorted list. Further, position/location of the defect is suggested based on the locations of the items selected from the sorted list.

The various actions in method 500 may be performed in the order presented, in a different order or simultaneously. Further, in some embodiments, some actions listed in FIG. 5 may be omitted.

Figure 6:
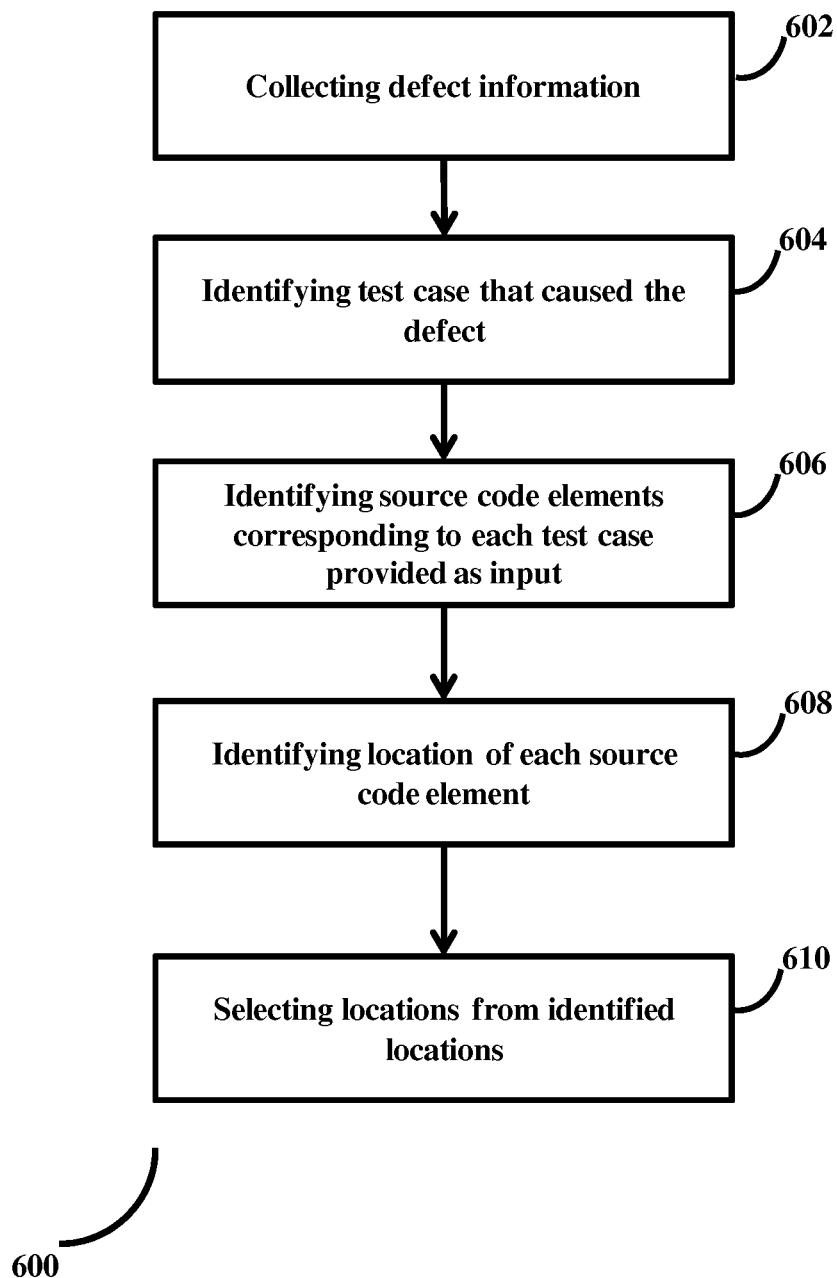
FIG. 6 is a flow diagram which depicts various steps involved in the process of historical data based defect positioning using a third mode of defect positioning procedure, as disclosed in the embodiments herein.

FIG. 6 is a flow diagram which depicts various steps involved in the process of historical data based defect positioning using a third mode of defect positioning procedure, as disclosed in the embodiments herein. The content processing module 203 selects the third mode when only defect information is received (602) as input, wherein the defect information comprises of a defect title and a defect description. Upon receiving the defect information as input, the content processing module 203 identifies (604) at least one test case which could probably be related to the input defect. The content processing module 203 may identify related test cases by comparing title and description of the defect with title and description of each defect being considered, using at least one of or a possible combination of suitable text processing clustering algorithms, and natural language processing algorithms.

Further, the content processing module 203 identifies (606) source code elements corresponding to test case received as input. In an embodiment, the source code elements corresponding to test cases are identified by performing database mining of history data. For example, test execution history, and source code changes database may be used to obtain information about source code elements. Further, the content processing module 203 identifies (608) location of each of the source code elements using the data mining process.

After identifying locations of the source code elements, the content processing module 203 sorts a list (LS) of the identified source code elements based on pre-defined criteria. For example, the criteria may be defined based on at least one of a last change time, software metrics such as Cyclomatic complexity, or number of defects mapped to given code element.

After sorting the list, the content processing module 203 selects (610) a specific number (m) of items from the sorted list. Further, position/location of the defect is suggested based on the locations of the items selected from the sorted list.

The various actions in method 600 may be performed in the order presented, in a different order or simultaneously. Further, in some embodiments, some actions listed in FIG. 6 may be omitted.

Figure 7:
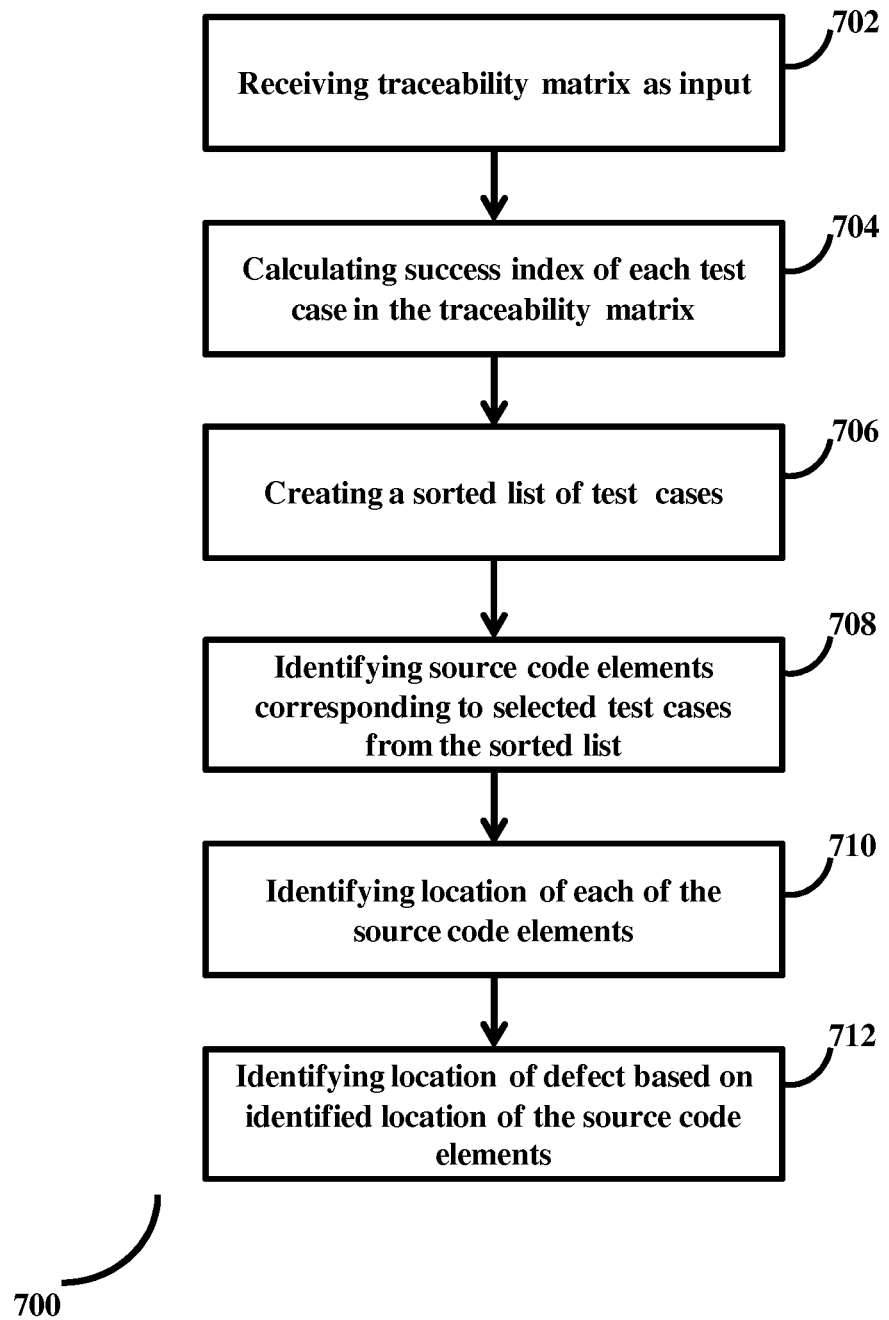
FIG. 7 is a flow diagram which depicts various steps involved in the process of historical data based defect positioning using a fourth mode of defect positioning procedure, as disclosed in the embodiments herein.

FIG. 7 is a flow diagram which depicts various steps involved in the process of historical data based defect positioning using a fourth mode of defect positioning procedure, as disclosed in the embodiments herein. The content processing module 203 opts for the fourth method when input (702) is a traceability matrix which possesses information regarding test cases and corresponding source code elements. In an embodiment, the traceability matrix may be generated by performing database mining.

Upon receiving the traceability matrix, the content processing module 203 calculates (704) a success index value for each test case in the traceability matrix. The success index value indicates extent to which a test case execution has been successful in the past. The success index value of a test case may be calculated as:

$$\text{Success Index}(S_i) = (\text{number of success} - \text{number of failure}) \quad (1)$$

A higher value of success index of a test case may indicate that execution of that test case is likely to be successful, whereas a lower value of the success index of a test case may indicate that chances of failure in case of execution of that particular test case is more. Further, the content analysis module 203 sorts the test cases according to an ascending or descending order of value of the success index, as indicated by a user preferred criteria, and creates (706) a sorted list of test cases.

From the sorted list of test cases, the content processing module 203 selects a specific number (n) of test cases, based on pre-configured user criteria. For example, top 10 results from the list may be selected by the content processing module 203. Further, the content processing module 203 identifies (708) source code elements corresponding to each of the selected test cases. In an embodiment, the source code elements corresponding to the test cases may be identified by performing database mining of selected databases. Further, the content processing module 203 identifies (710) location of each of the source code elements, by performing the database mining.

After identifying the location of each of the source code elements, the content processing module 203 identifies (712) a preferred location of the defect based on at least one criteria pre-configured by the user. For example, the criteria may be but not limited to a last change time, software metrics such as Cyclomatic complexity, and number of defects mapped to given code element.

The various actions in method 700 may be performed in the order presented, in a different order or simultaneously. Further, in some embodiments, some actions listed in FIG. 7 may be omitted.

Figure 8:
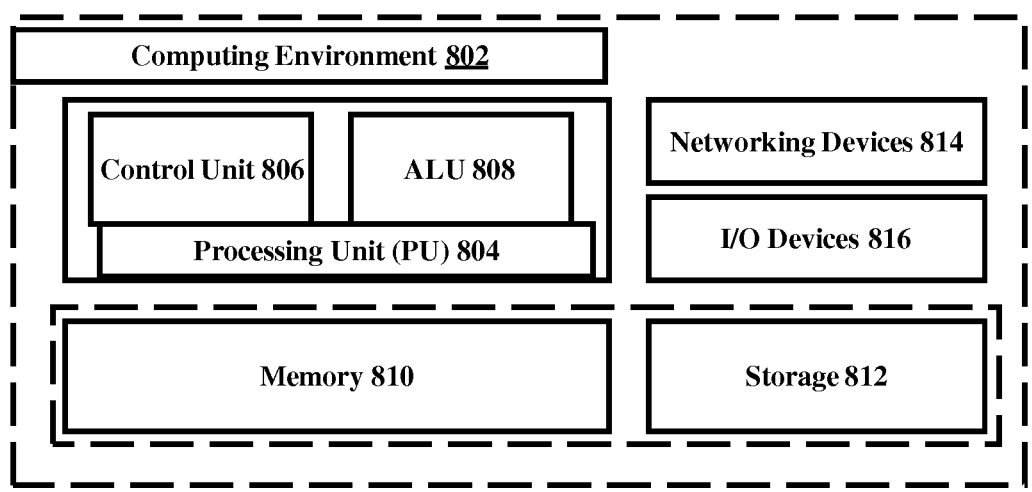
FIG. 8 illustrates a computing environment implementing the method and system, as disclosed in the embodiments herein.

FIG. 8 illustrates a computing environment implementing the method and system, as disclosed in the embodiments herein. As depicted, the computing environment 802 comprises at least one processing unit 804 that is equipped with a control unit 806 and an Arithmetic Logic Unit (ALU) 808, a memory 810, a storage unit 812, plurality of networking devices 814 and a plurality Input output (I/O) devices 816. The processing unit 804 is responsible for processing the instructions of the algorithm. The processing unit 804 receives commands from the control unit 806 in order to perform its processing. Further, any logical and arithmetic operations involved in the execution of the instructions are computed with the help of the ALU 808.

The overall computing environment 802 can be composed of multiple homogeneous and/or heterogeneous cores, multiple CPUs of different kinds, special media and other accelerators. The processing unit 804 is responsible for processing the instructions of the algorithm. Further, the plurality of processing units 804 may be located on a single chip or over multiple chips.

The algorithm comprising of instructions and codes required for the implementation are stored in either the memory unit 810 or the storage 812 or both. At the time of execution, the instructions may be fetched from the corresponding memory 810 and/or storage 812, and executed by the processing unit 804. In case of any hardware implementations various networking devices 814 or external I/O devices 816 may be connected to the computing environment to support the implementation through the networking unit and the I/O device unit.

The embodiments disclosed herein can be implemented through at least one software program running on at least one hardware device and performing network management functions to control the network elements. The network elements shown in FIG. 2 include blocks which can be at least one of a hardware device, or a combination of hardware device and software module.

The embodiments disclosed herein specify a system for software defect positioning. The mechanism allows software defect positioning based on historical data, providing a system thereof. Therefore, it is understood that the scope of protection is extended to such a system and by extension, to a computer readable means having a message therein, said computer readable means containing a program code for implementation of one or more steps of the method, when the program runs on a server or mobile device or any suitable programmable device. The method is implemented in a preferred embodiment using the system together with a software program written in, for ex. Very high speed integrated circuit Hardware Description Language (VHDL), another programming language, or implemented by one or more VHDL or several software modules being executed on at least one hardware device. The hardware device can be any kind of device which can be programmed including, for ex. any kind of a computer like a server or a personal computer, or the like, or any combination thereof, for ex. one processor and two FPGAs. The device may also include means which could be for ex. hardware means like an ASIC or a combination of hardware and software means, an ASIC and an FPGA, or at least one microprocessor and at least one memory with software modules located therein. Thus, the means are at least one hardware means or at least one hardware-cum-software means. The method embodiments described herein could be implemented in pure hardware or partly in hardware and partly in software. Alternatively, the embodiment may be implemented on different hardware devices, for ex. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method of historical data based defect positioning, said method comprising:
   receiving a user input related to a defect being identified;
   selecting a mode of defect positioning procedure, if said user input is a traceability matrix, wherein said traceability matrix is a mapping between at least one test case and corresponding source element changes, using said defect positioning system; and
   identifying a location of said defect using said defect positioning system, wherein said location of the defect using said mode of defect positioning procedure is identified by:
      calculating a success index for each test case listed in said traceability matrix, using said defect positioning system;
      creating a sorted list by sorting said test cases in said traceability matrix based on value of said success index, using said defect positioning system;
      selecting a plurality of test cases from said sorted list, based on at least one pre-configured criteria, using said defect positioning system;
      identifying source code elements corresponding to each of said plurality of test cases selected from said sorted list, using defect positioning system;
      identifying location of each of said plurality of source code elements identified corresponding to each of said plurality of test cases, using said defect positioning system; and
      identifying location of said defect based on said identified location of each of said plurality of source code elements, using said defect positioning system.

2. A system for historical data based defect positioning, said system comprising:
   a hardware processor; and
   at least one of a memory unit, wherein said at least one of said memory unit comprises a plurality of instructions, said instructions configured to cause said hardware processor to:
   receive a user input related to a defect being identified;
   select a mode of defect positioning procedure, if said user input is a traceability matrix, wherein said traceability matrix is a mapping between at least one test case and corresponding source element changes, using said defect positioning system; and
   identify a location of said defect using said defect positioning system, wherein said defect positioning system is further configured to identify said location of the defect using said mode of defect positioning procedure by:
      calculating success index for each test case listed in said traceability matrix, using a content processing module;
      creating a sorted list by sorting said test cases in said traceability matrix based on value of said success index, using said content processing module;
      selecting a plurality of test cases from said sorted list, based on at least one pre-configured criteria, using said content processing module;
      identifying source code elements corresponding to each of said plurality of test cases selected from said sorted list, using said content processing module;
      identifying location of each of said plurality of source code elements identified corresponding to each of said plurality of test cases, using said content processing module; and
      identifying location of said defect based on said identified location of each of said plurality of source code elements, using said content processing module.

3. A computer program product for historical data based defect positioning, the product comprising:
   an integrated circuit comprising at least one processor;
   at least one memory having a computer program code within said circuit, wherein said at least one memory and said computer program code with said at least one processor cause said product to:
   receive a user input related to a defect being identified;
   select a mode of defect positioning procedure, if said user input is a traceability matrix, wherein said traceability matrix is a mapping between at least one test case and corresponding source element changes; and
   identify a location of said defect using said defect positioning system, wherein said defect positioning system is further configured to identify said location of the defect using said mode of defect positioning procedure by:
      calculating success index for each test case listed in said traceability matrix;
      creating a sorted list by sorting said test cases in said traceability matrix based on value of said success index;
      selecting a plurality of test cases from said sorted list, based on at least one pre-configured criteria;
      identifying source code elements corresponding to each of said plurality of test cases selected from said sorted list;
      identifying location of each of said plurality of source code elements identified corresponding to each of said plurality of test cases; and identifying location of said defect based on said identified location of each of said plurality of source code elements.

\* \* \* \* \*